Jan. 5, 1965 G. CAMILLI 3,164,666
FLUID INSULATED ELECTRICAL APPARATUS
Filed June 26, 1961 2 Sheets-Sheet 1
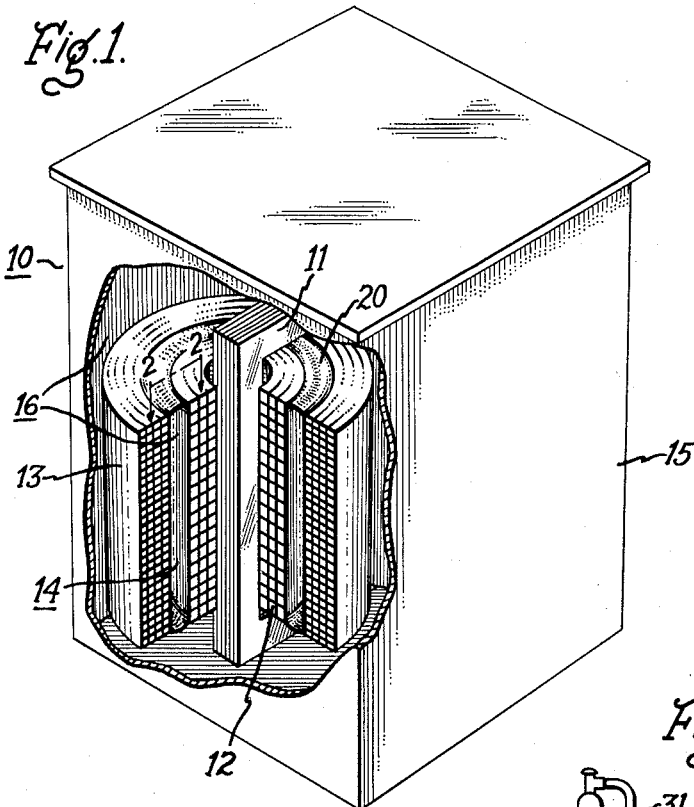
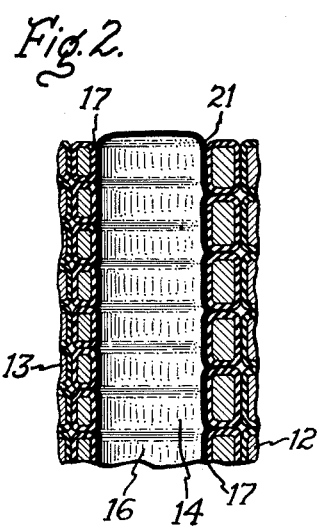
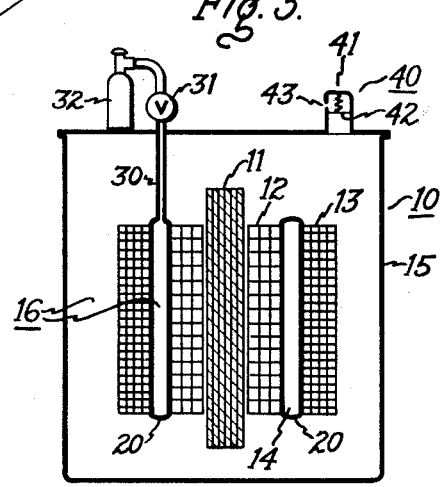
Inventor:
Guglielmo Camilli,
by *Gilbert P. Tarleton*
His Attorney.

United States Patent Office 3,164,666
Patented Jan. 5, 1965

3,164,666
FLUID INSULATED ELECTRICAL APPARATUS
Guglielmo Camilli, Pittsfield, Mass., assignor to General Electric Company, a corporation of New York
Filed June 26, 1961, Ser. No. 131,034
15 Claims. (Cl. 174—17)

This invention relates to electrical apparatus of the type insulated by dielectric fluids, and more particularly to improved means and methods for increasing the effectiveness of fluid insulation mediums.

Various high dielectric strength gases have long been employed as insulating and cooling mediums in electrical apparatus, such as transformers and the like. Usually such gases have increased dielectric strength and better insulating properties when their pressure is increased. Electrical apparatus insulated and cooled by high dielectric strength gases has many advantages when compared with similar apparatus insulated and cooled by high dielectric strength liquids or solids. For example, the size, weight, and noise level of gas-insulated apparatus is much less than in corresponding liquid or solid-insulated apparatus. However, many gases cannot be used effectively in high voltage apparatus unless their pressure is increased to a relatively high level. This has caused numerous practical difficulties in the design and construction of enclosures for containing the apparatus at the high pressures required. In many types of electrical apparatus the expense and difficulty of fabricating a large pressure-tight enclosure to withstand the high pressures to which the gases must be raised outweigh the advantages of gas-insulated apparatus to the extent that liquid or solid insulation is more practical for commercial products.

My invention is directed primarily to overcoming the above problems by providing methods and means for obtaining the advantages of gaseous insulating mediums without the disadvantages brought about by the requirement that gas be at relatively high pressure. In some instances my teachings may also be applicable to liquid insulating mediums.

Accordingly, it is an object of the invention to provide improved fluid insulated and cooled electrical apparatus.

Another object of the invention is to improve encased, gas-filled electrical apparatus so that the apparatus enclosure need not be constructed to withstand the highest pressure to which gas in the enclosure is subjected.

Another object of the invention is to provide encased, fluid insulated and cooled electrical apparatus with an insulating fluid under pressure in areas of high electrical stress without subjecting the enclosure for the apparatus to the high pressure.

Another object of the invention is to provide means for increasing the insulating strength of an insulating fluid by increasing its pressure without increasing to the same level the pressure that an apparatus enclosure must withstand.

A further object of the invention is to provide means for increasing the insulating strength of a gas by maintaining the gas at a higher pressure in zones of high electrical stress than in zones of relatively low electrical stress.

Other objects and advantages of the invention will become apparent from the drawing, specification, and claims, and the scope of the invention will be pointed out in the claims.

Briefly stated, according to one aspect of the invention, electrical apparatus having spaced-apart portions or elements at different electrical potentials is enclosed in a container having an insulating and cooling fluid therein. The insulating strength of the fluid is increased in required locations by maintaining the fluid in the space between such portions at a higher pressure than the fluid occupying the remainder of the enclosure.

Another aspect of the invention involves methods for increasing the insulating strength of a dielectric fluid in zones of high electrical stress in encased electrical apparatus by maintaining the fluid occupying the zones of high electrical stress at higher pressures than the fluid occupying zones of lower electrical stress.

In the drawing:

FIGURE 1 is an isometric, partially broken-away, schematic illustration of electrical apparatus in accord with the teachings of my invention.

FIGURE 2 is an enlarged, cross-sectional view taken generally along the line 2—2 in FIGURE 1.

FIGURE 3 is a schematic, side sectional view of another embodiment of the invention.

Figure 4:
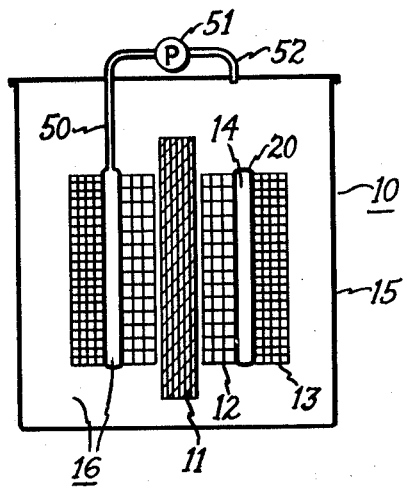
FIGURE 4 is a schematic, side sectional view of a further embodiment of the invention.

Referring now to FIG. 1, therein is shown an embodiment of an electrical power transformer 10 in accord with the teachings of my invention. It is to be understood, however, that my invention is also applicable to other types of electrical apparatus. The transformer 10 may comprise a magnetic core 11 surrounded by a low voltage winding 12 which is surrounded by a coaxial high voltage winding 13. The windings 12 and 13 may be formed from a plurality of coils of insulated conductor material. The windings 12 and 13 are at different electrical potentials during operation of the apparatus and are spaced apart by a zone 14 of high electrical stress. During normal operation of the transformer 10, the remaining zones are at a lower electrical stress than the zone 14. The transformer 10 is encased in an enclosure or container 15 that should be fluid-tight. An insulating and cooling gas occupies the container 15. Other conventional accessories such as bushings, tap-changers, and heat exchangers with their associated fluid circulating systems, may be employed with the transformer 10, but such accessories have not been illustrated or described because they form no part of the present invention.

The gas 16 should have a high dielectric strength and its other properties should make it compatible with other materials in the transformer 10 under the operating conditions encountered. For example, various electronegative gases, such as sulphur hexafluoride ($SF_6$), have properties that make them suitable for insulating and cooling electrical apparatus. Non-electronegative gases such as nitrogen are also usable for such purposes. Mixtures of gases are also usable, and it is to be understood in that the specification and claims, the term "gas" is intended to mean a single gas or mixtures of gases.

As is well known in the art, the insulating strength of such gases usually increases with increases in pressure. This is true of certain non-electronegative gases, such as nitrogen, whether they are in uniform electrical fields or in non-uniform fields. However, when electronegative gases such as sulphur hexafluoride are employed, increases in gas pressure result in increases in dielectric and insulating strength only when the electrical field is substantially uniform. Therefore, when a gas is said to have increased insulating strength as its pressure is increased, it is intended that the field to which gas is subjected be substantially uniform or else the gas be of a nature that its insulating strength is increased with pressure regardless of field uniformity. As is also known in the art, certain gases that have decreased insulating strength with increased pressure in non-uniform fields may be combined with nitrogen to form a gas mixture that has increased insulating strength with increases in pressure regardless of field uniformity. Various mixtures of such gases are disclosed in U.S. Patent 2,853,540, to Camilli et al., which is assigned to the same assignee as this invention.

To obtain the advantages associated with relatively high gas pressure without the disadvantage of having to make the enclosure 15 strong enough to withstand such pressure, electrical apparatus in accord with my teachings is provided with means for confining a relatively small volume of the gas 16 at a relatively high pressure in a zone of high electrical stress, while the remainder of the gas in the apparatus is at a lower pressure. As shown in FIG. 1, the means confining the gas at a high pressure may be container means, such as a resilient bag 20, located between the low voltage winding 12 and high voltage winding 13 in the zone 14 of high electrical stress. The bag 20 may be filled with gas 16 at a relatively high pressure (e.g., 50 p.s.i.g.) while the remainder of the enclosure 15 may be under a much lower gas pressure (e.g., 5 p.s.i.g.). The bag 20 is spaced on all sides from the enclosure 15 so that the increased pressure of the gas in the bag is not transmitted to the enclosure. The gas in the bag 20 need not be the same gas which fills the enclosure 15; for example, the gas in the bag 20 may be a more expensive gas than that used in the enclosure 15, since the volume of the bag is much less than the volume of the enclosure. When different gases are used in the bag and enclosure, the gases should be compatible with each other, since some leakage from the bag to the enclosure is expected. If the bag 20 should burst, the enclosure 15 would not be subject to the same pressure as the gas in the bag, since the enclosure 15 has a much greater volume than the bag 20. In some instances this will permit a conventional pressure relief device of the type used to relieve excess gas pressure from the enclosure 15 also to relieve the sudden pressure rise caused by bursting of the bag.

FIGURE 2 illustrates an advantage of utilizing a bag 20 having sufficient flexibility so that the sides of the bag are forced outwardly by the gas pressure into the interstices between the turns of the winding. As shown the outer surface 21 of bag 20 closely conforms to the exterior configuration of the outer layer 17 of insulation on the conductors forming the windings 12 and 13. The bag surface 21, in fitting tightly against the winding layer 17, substantially eliminates pockets of low pressure gas between the outer surface of the bag 20 and the winding insulation. The elimination of low pressure gas pockets solves the problems previously encountered in gas-insulated apparatus which were brought about because materials of different dielectric constants were in series between parts at high electrical stresses. As is well known in the art, the electrical stress on insulating materials in series is shared by the materials inversely to their dielectric constant; thus when low pressure gas and a solid are in series, the gas must bear a much higher proportion of the electrical stress than the solid because its dielectric constant is only a fraction of that of the solid. This usually results in corona being formed on the outer layer of the solid because of breakdown of the gas. However, by practicing my invention, the only gas in series between the windings 12 and 13 will be the gas in the bag 20 which is at a relatively high pressure. This increases its dielectric strength to a level high enough that it is not subject to breakdown or corona at the electrical stresses ordinarily encountered.

As illustrated in FIG. 2, the field between the windings 12 and 13 may be made relatively uniform by the elimination of sharp points or square corners in the outer insulation layer 17. This will enable gases that do not have increased insulating strength at high pressures in non-uniform fields to be employed, and will also prevent puncture of the bag 20.

The bag 20 may be made from any stretchable, flexible material such as rubber, plastic films such as polyethylene, or various impregnated cloths or laminated materials, so long as the material is compatible with the gas 16 under the conditions encountered. Since the bag 20 will not be subjected to an oxidizing atmosphere, a relatively long life can be expected. However, no matter what the bag material, gas leaks can be expected in the bag 20 or the gas 16 can be expected to gradually diffuse therefrom in time. FIGURE 3 illustrates one embodiment of means for maintaining gas in the bag 20 at the desired pressure. The bag 20 is provided with a filler tube 30 connected by means of a pressure regulated valve 31 to a source 32 of gas under pressure, such as a bottle of liquified gas 16. When the gas 16 in the bag 20 escapes and the bag pressure falls below a predetermined safe value, the valve 31 will be actuated to permit gas to flow from the supply 32 into the bag 20 until the predetermined safe pressure is attained. Then the valve 31 will close to prevent further pressurization of the bag 20. To prevent over-pressure in the enclosure 15, any suitable pressure relief mechanism 40, such as a cylinder 41 connected to the interior of the enclosure 15 and having a spring-biased piston 42 movable past an opening 43 may be provided. When the pressure in the enclosure 15 increases beyond a predetermined value, the gas pressure will force the piston 42 beyond the opening 43 and permit escape of the gas 16. When the gas pressure returns to the predetermined value, the spring will force the piston 42 past the opening 43 and thus prevent further escape of the gas 16.

Though satisfactory for some applications, the embodiment of FIG. 3 possesses the disadvantage that it permits loss of the gas 16 to the atmosphere. When the gas 16 is relatively expensive, this may be undesirable. FIG. 4 illustrates another embodiment which prevents escape of gas to the atmosphere. The bag 20 is hydraulically connected by means of an inlet tube 50 to the outlet side of a pressure regulated pump or compressor 51. The inlet side of the pump 51 is hydraulically connected by a tube 52 to the interior of the apparatus container 15. As gas escapes from the bag 20, the pressure therein falls. When the bag gas pressure falls below a predetermined level, the pump 51 will be actuated to take gas from the enclosure 15 and pump it back into the bag 20 until the predetermined pressure level is reached. At that time the pump 51 will be turned off. In addition to maintaining the bag 20 at a high pressure, this arrangement will also maintain the container 15 at a predetermined safe low pressure. The enclosure 15 also may be provided with suitable pressure relief means, such as 40 in FIGURE 3, to prevent rupture of the enclosure if a sudden pressure rise is encountered before the pump 51 can return the container pressure to a safe level.

Figure 5:
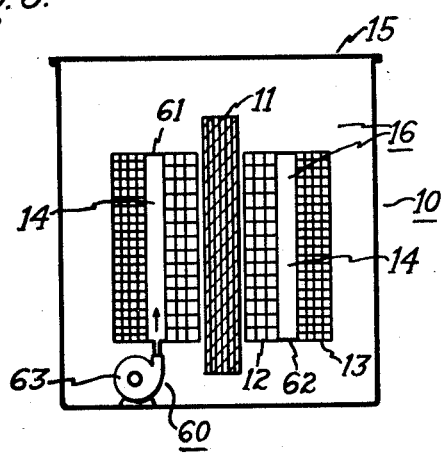
FIGURE 5 is a schematic, side sectional view of a still further embodiment of the invention.

FIGURE 5 illustrates another embodiment of the invention in which means 60 is provided for maintaining the gas 16 at a relatively high pressure between spaced-apart portions of apparatus at high electrical stress. In FIGURE 5 a conventional transformer 10 of essentially the same structure as shown and described previously has the high stress zone 14 between its low voltage winding 12 and high voltage winding 13 closed off by suitable means, such as a diaphragm 61 of rigid insulating material at one end of the windings, and another diaphragm 62 of rigid insulating material at the other end of the windings. Compressor means such as a centrifugal fan 63 is provided with its outlet side discharging into the enclosed zone 14 of high electrical stress between the windings. The inlet side of the compressor means is vented to the interior of the enclosure 15. Upon actuation of the compressor means 63, gas 16 from the interior of the enclosure 15 will be forced into the zone 14, thus maintaining the zone 14 at a higher pressure than the remainder of the enclosure. Some of the gas 16 will diffuse radially outwardly between the conductor layers of the windings 12 and 13 and will carry heat from the windings to the enclosure 15, where it will be dissipated to the atmosphere. If desired, the diaphragms 61 and 62 may be provided with small openings (not illustrated) to permit regulated circulation of the gas through the zone 14 for cooling purposes.

It has thus been shown that by the practice of my invention the advantages obtainable from gases that have their insulation strength increased at higher pressures may be achieved without the disadvantages involved in constructing the apparatus enclosure strong enough to withstand the higher pressures. This is achieved by completely enveloping the high pressure gas with gas at a lower pressure so that only the low pressure gas acts upon the enclosure. As evident from the foregoing description, my invention also includes methods of increasing the insulating effect of pressurized gas in encased apparatus by maintaining different pressure zones in the apparatus. Zones at high electrical stresses are maintained at higher pressures than the remainder of the apparatus enclosure.

It will be understood, of course, that while the forms of the invention herein shown and described constitute preferred embodiments of the invention, it is not intended herein to illustrate all of the equivalent forms or ramifications thereof. For example, those skilled in the art will realize that the advantages obtainable for gases at high pressure may also be obtained for liquids by confining liquid insulation in a stretchable, flexible container or by pressurizing the liquid by means of suitable pump or compressor means in zones of high electrical stress; the increase in liquid pressure in the high stress zones will increase its insulating strength by causing any gas in the zone to dissolve more readily in the liquid or by compressing gas bubbles trapped in the liquid. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. Electrical apparatus having spaced-apart portions at different electrical potentials, an enclosure containing said apparatus, an insulating fluid occupying said enclosure including the space between said spaced-apart portions, and means maintaining the entire body of fluid within said space at a higher pressure than the fluid occupying the remainder of said enclosure, said higher pressure being sufficient to increase significantly the insulating strength of said fluid.

2. Electrical apparatus having spaced-apart portions at different electrical potentials, an enclosure containing said apparatus, an insulating gas occupying said enclosure, and a bag containing a body of insulating gas and occupying the entire space between said spaced-apart portions, said bag maintaining the contained gas at a pressure higher than the gas occupying the remainder of said enclosure and sufficient to increase significantly the insulating strength of said gas.

3. Electrical apparatus having spaced-apart portions at different electrical potentials, an enclosure containing said apparatus, an insulating gas occupying said enclosure, a flexible stretchable bag occupying the entire space between said spaced-apart portions, said bag being inflated with a body of said gas to fill substantially the entire space between said portions and retain said body of gas at a pressure higher than that of the gas occupying the remainder of said enclosure, said higher pressure forcing said bag tightly against said spaced-apart portions and being sufficient to increase significantly the dielectric strength of the body of gas in said bag.

4. In electrical apparatus, the combination comprising spaced windings at different electrical potentials, an enclosure containing said windings, an insulating gas occupying said enclosure, a flexible bag occupying the entire space between said windings, said bag confining a body of said gas at a higher pressure than the gas occupying the remainder of said enclosure, and said body of gas forcing said bag tightly against said windings.

5. In electrical apparatus, the combination comprising spaced elements at different electrical potentials, an enclosure containing said elements, an insulating gas occupying said enclosure, a flexible bag occupying the entire space between said elements, said bag confining a body of said gas at a higher pressure than the gas occupying the remainder of said enclosure, and the inside of said bag being connected to the inside of said enclosure by means that returns to said bag gas that has escaped therefrom.

6. In electrical apparatus, the combination comprising spaced elements at different electrical potentials, an enclosure containing said elements, an insulating gas occupying said enclosure, a flexible bag occupying the entire space between said elements, said bag confining a body of said gas at a higher pressure than the gas occupying the remainder of said enclosure, and means maintaining the pressure in said bag above a predetermined level.

7. In electrical apparatus, the combination comprising spaced elements at different electrical potentials, an enclosure containing said elements, an insulating gas occupying said enclosure, a flexible bag occupying the entire space between said elements, said bag confining a body of said gas at a higher pressure than the gas occupying the remainder of said enclosure, means maintaining the pressure in said bag above a predetermined level, and means maintaining the pressure in said enclosure below a predetermined level.

8. In electrical apparatus, the combination comprising spaced elements at different electrical potentials, an enclosure containing said elements, an insulating gas occupying said enclosure, a flexible bag occupying the entire space between said elements, said bag confining a body of said gas at a higher pressure than the gas occupying the remainder of said enclosure, the interior of said bag being connected to a higher pressure source of said gas through a pressure-regulated valve, and said valve being arranged to pass gas into said bag when the gas pressure in said bag falls below a predetermined level.

9. In electrical apparatus, the combination comprising spaced elements at different electrical potentials, an enclosure containing said elements, an insulating gas occupying said enclosure, a flexible bag occupying the entire space between said elements, said bag confining a body of said gas at a higher pressure than the gas occupying the remainder of said enclosure, the interior of said bag being connected to the outlet side of pressure-regulated pump means, the inlet side of said pump means being connected to the interior of said enclosure, and said pump means being actuated when the pressure in said bag falls below a predetermined level to pump gas from said enclosure into said bag, whereby gas that has escaped from said bag into said enclosure can be returned to said bag.

10. Electrical apparatus having spaced-apart portions at different electrical potentials, an enclosure containing said apparatus, an insulating gas occupying said enclosure, means cooperating with said spaced-apart portions to define a closed-off zone therebetween, and compressor means forcing said gas into said closed-off zone so that the pressure of the gas occupying the space between said spaced-apart portions is higher than the pressure of the gas occupying the remainder of said enclosure.

11. In electrical apparatus, the combination comprising spaced windings at different electrical potentials, an enclosure containing said windings, an insulating gas occupying said enclosure, insulating barriers closing off the ends of the space between said windings so as to define therebetween an enclosed zone at relatively high electrical stress, a centrifugal fan having its inlet side arranged to take in gas from said enclosure and its outlet side discharge gas into said enclosed zone so that the pressure of the gas occupying the space between said windings is higher than the pressure of the gas occupying the remainder of said enclosure.

12. Enclosed electrical apparatus having a casing defining a zone of relatively large volume at low electrical stress, said large volume zone including therewithin a relatively small volume zone at high electrical stress, means enclosing the entire small volume high stress zone, said large volume low stress zone surrounding said means and containing no unenclosed region at significantly higher electrical stress, electrical insulating fluid in both of said zones subjected to their respective electrical stresses, and means maintaining substantially the entire body of fluid in the smaller volume higher stress zone under pressure higher than the pressure of the fluid in the surrounding larger volume lower stress zone, said higher pressure being sufficient to increase significantly the dielectric strength of said fluid, whereby the casing of said apparatus need not be constructed to withstand the higher pressure of the high stress zone and equalization of the pressures in said zones due to accidental rupture of the means enclosing the smaller volume higher pressure zone will not substantially increase the pressure to which said casing is normally subjected.

13. Apparatus as in claim 12 in which the fluids in both zones are gaseous.

14. Apparatus as in claim 12 in which said higher stress zone is the radial and coaxial space between concentric transformer windings of different voltage.

15. Apparatus as in claim 12 in which said means is a bag of flexible insulating material between concentric transformer windings of different voltage.

References Cited by the Examiner
UNITED STATES PATENTS 2,011,561  8/35  Chase _____ 174—12
2,374,055  4/45  Treanor _____ 336—105

JOHN F. BURNS, Primary Examiner.

BENNETT G. MILLER, JOHN P. WILDMAN, DARRELL L. CLAY, Examiners.